H. A. MINER.
Clasps.

No. 214,577.  Patented April 22, 1879.

Witnesses,
W. J. Cambridge
D. C. Bates.

Inventor
Henry A. Miner
Per Teschenicher & Stearns,
Attorneys.

UNITED STATES PATENT OFFICE.

HENRY A. MINER, OF EAST CAMBRIDGE, MASSACHUSETTS, ASSIGNOR TO HIMSELF AND ARTHUR F. THOMPSON, OF SAME PLACE.

IMPROVEMENT IN CLASPS.

Specification forming part of Letters Patent No. 214,577, dated April 22, 1879; application filed August 21, 1878.

*To all whom it may concern:*

Be it known that I, HENRY A. MINER, of East Cambridge, in the county of Middlesex and State of Massachusetts, have invented an Improved Clasp for Supporting Socks, Sleeves, Garments, &c., of which the following is a full, clear, and exact description, reference being had to the accompanying drawings, making part of this specification, in which—

Figure 3:
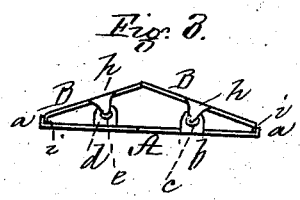
Figure 1:
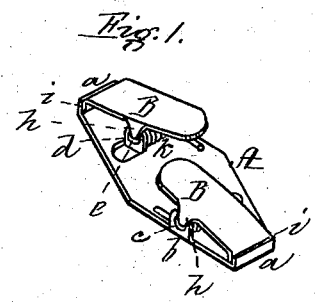
Figure 4:
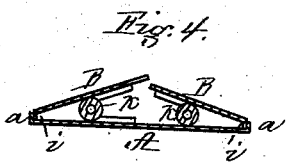
Figure 5:
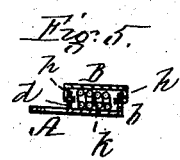
Figure 2:
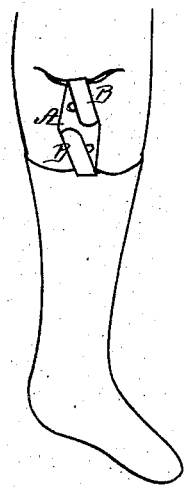
Figure 6:
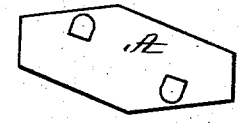
Figure 7:
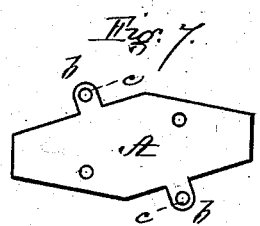
Figure 8:

Figure 1 is a perspective view of my improved clasp. Fig. 2 represents the same when employed as a sock-supporter. Fig. 3 is a side elevation of my clasp. Fig. 4 is a longitudinal section, and Fig. 5 a transverse section, through the same; Fig. 6, a plan of the under side of the clasp; Figs. 7 and 8, details to be referred to.

My present invention relates to that class of clasps employed in holding up socks, drawers, &c., and for shortening and supporting sleeves, dresses, and other garments; and consists in a single plate having two independent spring-levers pivoted to one of its faces, so as to form a pair of jaws at each end thereof, and arranged with their inner ends extending beyond each other, to economize space and facilitate the opening of the jaws, thereby constituting a double clasping device, which can be applied in an extremely ready and convenient manner to the arm or leg, in the direction of its length, without the employment of an elastic or non-elastic band or strip, thus avoiding compression and interference with the free circulation of the blood, incident to that class of supporters which partially or entirely encircle the limb.

To enable others skilled in the art to understand and use my invention, I will proceed to describe the manner in which I have carried it out.

In the said drawings, A represents a flat plate of metal, of the form shown in Figs. 1 and 6, its opposite ends being slightly turned up at $a$, as seen in Fig. 4. This plate is provided on each side with a projection, $b$, Fig. 7, which is turned up, as seen in Fig. 5, and is furnished with a small aperture, $c$; and opposite each of these projections is another similar projection, $d$, formed by punching and bending the metal up from the under side of the plate, these latter projections $d$ being each provided with an aperture, $e$, similar to $c$.

Each pair of projections $b\ d$ form ears, to which are pivoted the ears or projections $h$ on opposite sides of a lever, B, Fig. 8, the ends of these projections $h$ being so bent as to enter the apertures $c\ e$ of the ears or projections $b\ d$, thus forming a hinge. The outer end of each of these levers is turned over slightly at $i$, this portion $i$, with the corresponding end $a$ of the plate A, forming a pair of griping-jaws for grasping the edge or fold of the sock or other garment.

Each pair of jaws is kept closed by a coiled spring, $k$, having two long projecting ends, one of which is soldered or otherwise secured to the plate A, and the other to the lever B. The construction of the springs $k$ and the manner of pivoting the plates B may be varied, if desired.

The levers are arranged obliquely and parallel to each other, as seen in Fig. 1, which construction allows their inner ends to extend beyond each other, thus admitting of the use of levers B of sufficient length with a comparatively short plate, A, and also greatly facilitating the operation of opening the jaws, as plenty of space is afforded around the inner end of each lever to apply the pressure of the finger or thumb without interfering or coming into contact with the other lever.

When the clasp is to be used for supporting or holding up a sock, Fig. 2, one pair of jaws is caught over the top or edge of the sock and the other pair over a fold of the leg of the drawers, which, as they pass down inside the sock, prevent the plate A from coming into contact with and chafing the limb of the wearer.

In the application of my improved clasp for holding up a sleeve of a shirt or dress, the sleeve is first taken up or shortened, and the two pairs of jaws caught over the folds in a convenient and expeditious manner.

It is evident that my clasp may be used to advantage for supporting the drawers from the suspenders or from the waist of the pants of the wearer, and the slack of a vest may be taken in at the back by means of my said clasp.

The above-described clasp is simple, cheap, and durable; and as no elastic or non-elastic band is used in connection therewith, the compression and consequent interruption of the free circulation of the blood when the band is passed around the limb are entirely avoided.

I am aware that Letters Patent of the United States were granted to F. B. Brown on the 30th day of July, 1878, for a double clasp having three levers hinged together by a single pin; and I am also aware of the single clasp for which Letters Patent of the United States were granted to J. P. Lindsay, November 3, 1874; but to these devices I lay no claim.

What I claim as my invention, and desire to secure by Letters Patent, is—

A double clasping device for supporting socks, sleeves, &c., consisting of the plate A, having two independent spring-levers, B B, pivoted to one of its faces, so as to form a pair of jaws at each end thereof, and arranged with their inner ends extending beyond each other, and adapted for use substantially as described.

Witness my hand this 17th day of August, A. D. 1878.

HENRY A. MINER.

In presence of—
P. E. TESCHEMACHER,
W. J. CAMBRIDGE.